UNITED STATES PATENT OFFICE.

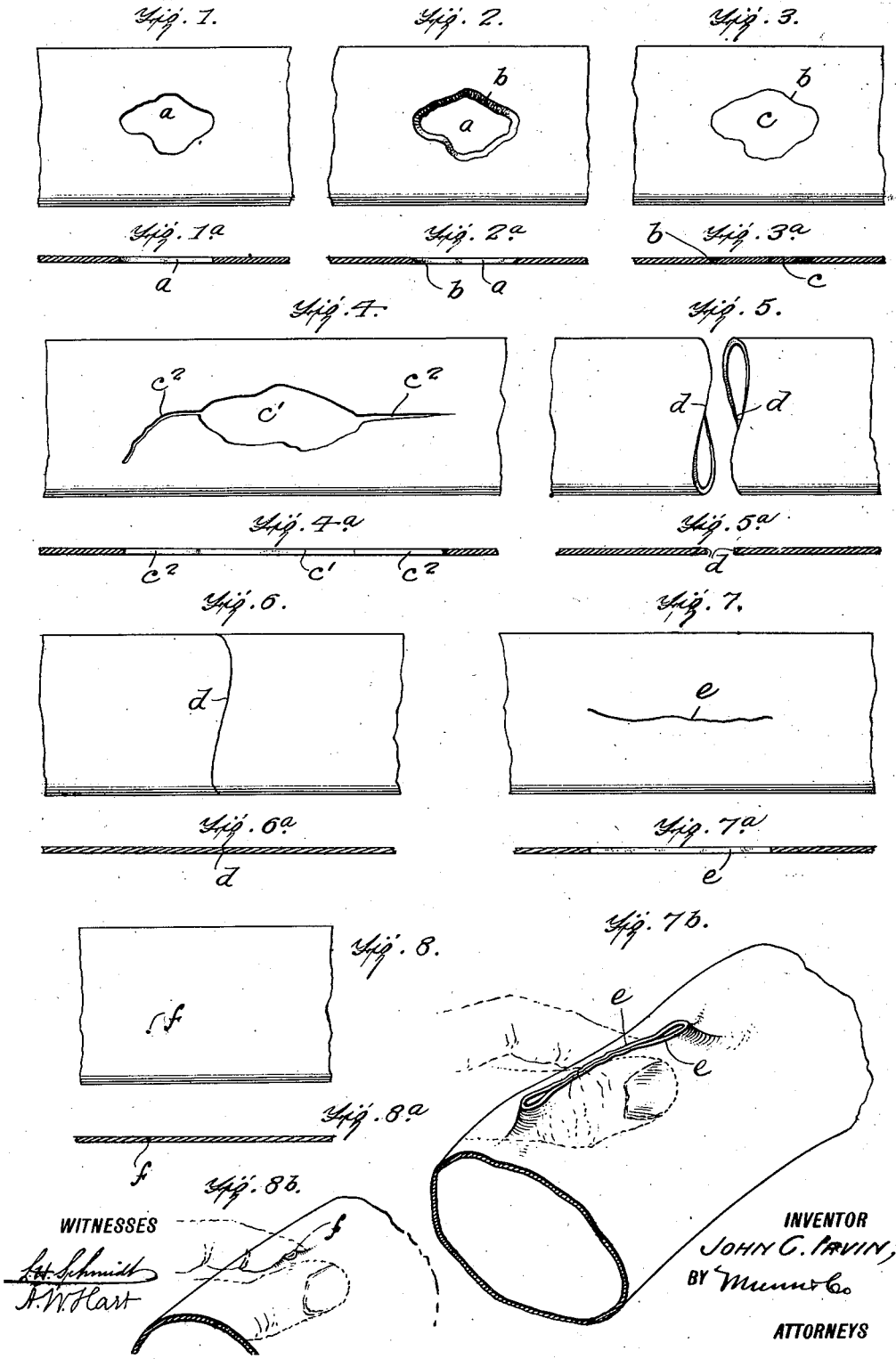

JOHN C. IRVIN, OF JERSEY SHORE, PENNSYLVANIA.

METHOD OF REPAIRING RUPTURED PNEUMATIC TUBES.

1,187,149. Specification of Letters Patent. Patented June 13, 1916.

Application filed October 6, 1914. Serial No. 865,229.

*To all whom it may concern:*

Be it known that I, JOHN C. IRVIN, a citizen of the United States, and a resident of Jersey Shore, in the county of Lycoming and State of Pennsylvania, have invented an Improved Method of Repairing Ruptured Pneumatic Tubes, of which the following is a specification.

The defects of the ordinary method or "patch" system of repairing punctures or other ruptures of pneumatic tubes in tires of auto vehicles are well known to experts, and numerous attempts have been made to overcome them, but without entire success.
By long experimentation and severe tests in actual use, I have discovered and demonstrated an improved method by which the said defects are entirely overcome, the method enabling repairs to be effected more cheaply and with practically absolute security, and without the use of a patch or reinforce such as is ordinarily employed.

The method is hereinafter described with reference to the accompanying drawing, in which—

Figures 1 to 8 inclusive, are plan views, and Figs. 1$^a$ to 8$^a$, inclusive, are sectional views, of the same parts illustrating the application of my method of tube repair; and Figs. 7$^b$ and 8$^b$ are views supplemental to Figs. 7 and 8.

As a preparatory step in the repair of a rubber tube which has been punctured or otherwise ruptured, I employ a file, sandpaper, or buffing-wheel for cleaning the surfaces of the tube adjacent to the puncture or rupture, thereby removing a portion of the oxidized surface and any foreign particles that may adhere to the same. If the edges of the opening $a$, Figs. 1 and 1$^a$, are ragged or uneven to a considerable degree, they are trimmed to fair uniformity of contour and outline, and are preferably beveled as shown at $b$, Figs. 2 and 2$^a$, in order to form a broader edge or adhering surface. I then prepare for insertion in the opening formed by the rupture, a piece of soft uncured or unvulcanized rubber $c$, Figs. 3 and 3$^a$, the same being cut from a rubber sheet having smooth parallel sides having the same thickness as the tube to which it is to be applied. The piece $c$ is cut to the same form and dimension as the opening $a$ into which it is therefore neatly fitted, as shown in Figs. 3 and 3$^a$.
Thus the inserted piece forms a smooth, flush surface on both sides, the two surfaces being parallel with each other. I then apply bisulfid of carbon to the raw edges of the rupture, whereby they are prepared for application of a cement, which may be that commonly used by tube repairers.

When a due degree of dryness has been attained, the parts treated as described are inserted in a vulcanizer between smooth, flat, and parallel dies or plates forming part of such apparatus. Vulcanization is carried to the usual degree in tube-repair, and the result is a tube having a uniform thickness or parallel surfaces, or a smooth flush joint between the inserted piece and the adjacent edges of the rupture. In other words, a practically homogeneous union between the inserted piece and the adjacent portions of the tube is produced, the joint having practically the same thickness, smoothness, elasticity, and durability as other portions of a tube where no puncture or rupture has occurred. Tubes thus repaired have, therefore, practically the same capacity to withstand wear and use as unruptured tubes, the same having thus a great advantage over tubes repaired by means of patches and reinforcements applied in the usual way.

In place of using a piece of raw or uncured rubber, as above described, for the inserted piece, I have found it practicable to produce a good result by using a piece of soft vulcanized rubber, the same being cut out of a rubber sheet having the same thickness as the tube at the point of repair, and the edges of the same being treated with bisulfid of carbon and the operation being the same as already described.

In Figs. 4 and 4$^a$ a tube section is shown with an elongated ruptured central portion presenting a considerable opening and the ends being rips or apertures whose edges are contiguous. In such case, a piece $c'$ of raw uncured rubber may be cut out and trimmed as required to fit neatly in the larger opening, and bisulfid of carbon and cement may be applied to the ruptured edges of the extension $c^2$.

In Figs. 5, 5$^a$, a tube is shown divided or torn in two transversely, and in Figs. 6 and 6$^a$ such edges are shown re-united as indicated at $d$. This may be effected by using a piece or narrow strip of raw or uncured rubber, which is applied between the opposed edges $d$, such strip having of course, the same thickness as the tube, so that when the joint is formed the exterior and interior surfaces will be parallel as in the cases before described. I find it is, however, practicable to form a good joint by dispensing with an inserted strip or piece and applying bisulfid of carbon and cement to the raw edges of the tube, and bringing them into contact, manually, then vulcanizing, as before described.

In Figs. 7, 7$^a$, a long cut or rupture $e$ is shown, and for closing it bisulfid of carbon and cement are successively applied to the raw edges. For this purpose the sides of the tube are compressed between the thumb and finger or brought together or folded as shown in Fig. 7$^b$, and the bisulfid and cement are successively applied to the raw edges while thus held together. Then, the parts being compressed together manually, the tube section in which the rupture $e$ appears is ready for vulcanization. It will be understood that this method is applicable to rips or blow-outs of great length, the adjacent edges being brought together, when practicable, or, whenever required, a piece of raw rubber being inserted in the manner already described.

Practically the same method is applied in repair where there is a simple round puncture $f$, as in Figs. 8 and 8$^a$. The rubber tube is folded or the sides held together as shown in Fig. 8$^b$, or as in the case of the rupture $e$ already described, and the bisulfid and cement are successively applied, as before described. It will be understood that in both these cases, that is to say, in repair of the ruptures $e$ and $f$, the bisulfid must be allowed to dry before the application of cement, as already described in reference to other punctures.

What I claim is:—

1. The method of repairing ruptured or punctured rubber tubes, which consists in fitting into the rupture a piece of sheet rubber having the same contour and size as the rupture and the same thickness as the edges of the tube adjacent to the rupture, then applying to the opposed edges of the tube and the inserted piece a substance adapted to clean and soften the same then applying rubber cement to the opposed edges and pressing them into close contact, and vulcanizing the parts thus treated, as described.

2. The method of repairing ruptures in rubber tubes, the same consisting in applying to the opposed raw edges of the rupture a substance adapted to clean and soften the same: next, applying a cement and bringing the opposed edges together and allowing the cement to dry; then vulcanizing the parts, the outer and inner surfaces of said edges being thus flush or parallel as described.

JOHN C. IRVIN.

Witnesses:
    AMOS W. HART,
    SOLON C. KEMON.